Oct. 12, 1971  J. R. MONTGOMERY ET AL  3,611,578
GAUGE MECHANISM

Filed April 30, 1969

INVENTORS
JOHN R. MONTGOMERY
ALBERT DUNKIN

BY
Stephen M. Mihaly
ATTORNEY

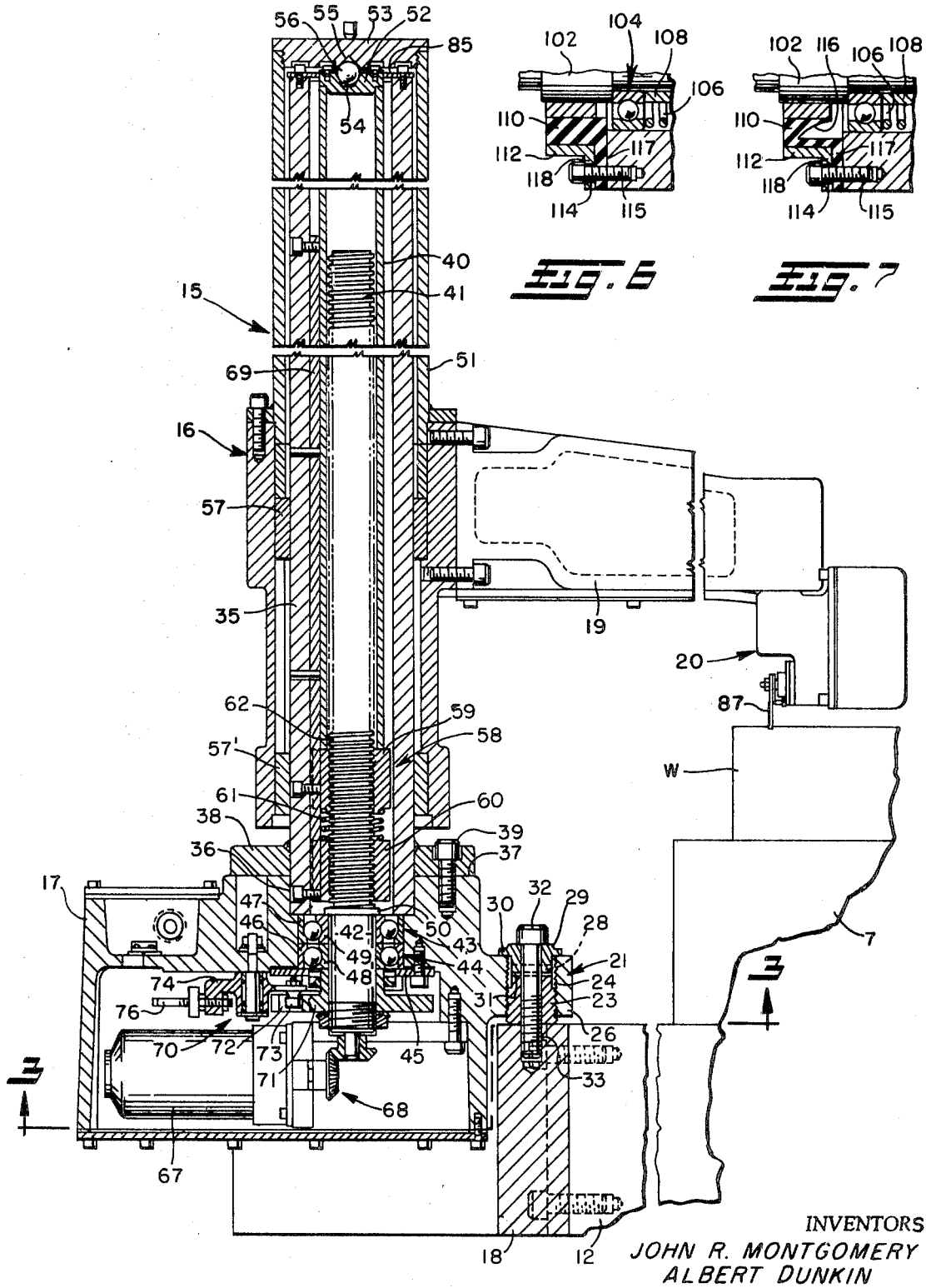

United States Patent Office 3,611,578
Patented Oct. 12, 1971

3,611,578
GAUGE MECHANISM
John R. Montgomery, Trumbull, and Albert Dunkin, South Norwalk, Conn., assignors to Pneumo Dynamics Corporation, Cleveland, Ohio
Filed Apr. 30, 1969, Ser. No. 820,509
Int. Cl. G01b 5/00
U.S. Cl. 33—170
20 Claims

ABSTRACT OF THE DISCLOSURE

A gauge mechanism including a gauge column having a gauge arm mounted thereon for vertical adjustment by rotation of a lead screw which drives a split or double nut separated by a spring urging the lower nut into engagement with the upper sides of the lead screw threads for supporting the weight of the movable column parts and urging the upper nut into engagement with the lower sides of the lead screw threads for providing a relatively wear-free reference surface for gauging the height of the gauge arm. A gauge head assembly mounted on the outboard end of the gauge arm has a feeler arm attached to a shaft supported in a resilient elastomeric torsion mount permitting a torsion load to be applied to the feeler arm for urging the feeler arm toward a work surface with sufficient force to dampen outward movements of the feeler arm as it rides up over the edge of the work surface and thus prevent over-shoot.

BACKGROUND OF THE INVENTION

The present invention generally relates to a gauge mechanism for use in accurately measuring the height or size of one or more workpieces having interrupted work surfaces.

For accurate machining of plural flat work surfaces as by grinding and the like, it is essential that frequent measurements be taken to insure when the desired finish size of the parts is reached. However, the taking of such measurements should not disrupt the machining operation if maximum production is to be achieved, which has caused considerable difficulty in obtaining accurate measurements of interrupted work surfaces using a feeler arm, since the feeler arm must have sufficient movement capabilities to ride up over the edges of successive work surfaces without over-shooting the top and giving a false reading.

Moreover, the feeler arm must be supported by a gauge column for vertical adjustment and after long use wear of the various parts of the gauge column often affects the preciseness of the measurements obtainable by the mechanism.

SUMMARY OF THE INVENTION

With the foregoing in mind, it is a principal object of this invention to provide a gauge mechanism for accurately measuring both continuous and interrupted work surfaces during machining.

Another object is to provide such a gauge mechanism with a feeler arm which readily rides up over the edge of successive work surfaces without any over-shoot.

Still another object is to provide such a gauge mechanism with a gauge column which may be accurately vertically adjusted for raising and lowering the feeler arm with respect to a work surface.

A further object is to provide such a gauge mechanism in which vertical adjustments of the gauge column are referenced to a surface having a preferential low wear rate to preserve the preciseness of adjustment.

Another object is to provide such a gauge mechanism in which both the gauge arm and gauge head assembly for the feeler arm are mounted for limited rotation.

These and other objects of the present invention are achieved by providing a gauge mechanism which generally consists of a gauge head assembly including a feeler arm supported by a shaft having a resilient elastomeric mount permitting a torsion load to be applied to the feeler arm for urging the feeler arm toward a work surface with sufficient force to dampen the outward movement of the feeler arm caused by engagement with the edge of the work surface to prevent over-shoot by the feeler arm. The configuration of the elastomeric mount may be varied to control the spring and damping effect on the feeler arm and also to provide a seal for the shaft.

The gauge head assembly is mounted on the outboard end of a gauge arm projecting outwardly from a gauge column, the height of which may be accurately adjusted by rotation of a lead screw. A split or double nut engages the lead screw and is separated by a spring which urges the lower nut into engagement with the upper sides of the lead screw threads for supporting the weight of the vertically movable column parts and urges the upper nut into engagement with the lower sides of the lead screw threads for providing a relatively wear-free reference surface for gauging the height of the column. The upper nut supports an inner sleeve and transmits its movements by means of a ball coupling to an outer sleeve which supports the gauge arm for both vertical movement and limited rotation.

To the accomplishment of the foregoing and related ends, the invention, then, comprises the features hereinafter fully described and particularly pointed out in the claims, the following description and the annexed drawings setting forth in detail certain illustrative embodiments of the invention these being indicative, however, of a few of the various ways in which the principle of the invention may be employed.

BRIEF DESCRIPTION OF THE DRAWINGS

In the annexed drawings:

FIG. 2 is a partial longitudinal section through the gauge mechanism of FIG. 1;

FIG. 3 is a horizontal section through the base of the gauge column of FIG. 2, taken on the plane of the line 3—3 thereof;

FIG. 4 is an enlarged longitudinal section through the outboard end of the gauge arm and gauge head assembly of FIG. 2;

FIG. 5 is an end view of the feeler arm for the gauge head assembly as seen from the plane of the line 5—5 of FIG. 4; and FIGS. 6 and 7 are fragmentary longitudinal sections through modified forms of elastomeric torsion mounts for the shaft of the gauge head assembly which carries the feeler arm.

DESCRIPTION OF THE PREFERRED EMBODIMENTS

Figure 1:
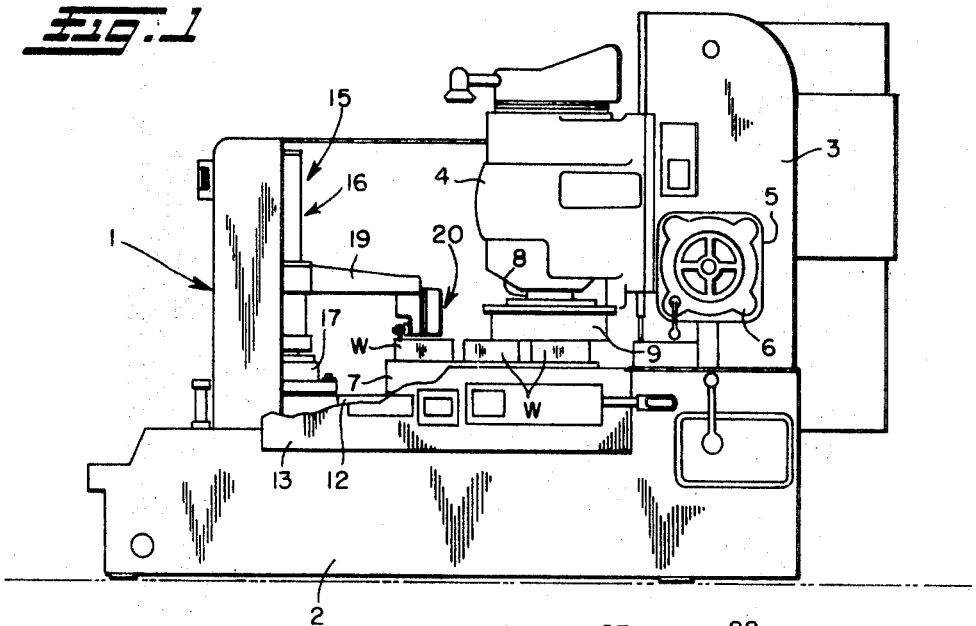
FIG. 1 is a side elvation view of a grinding machine to which is attached a preferred form of gauge mechanism constructed in accordance with this invention.
Figure 1:
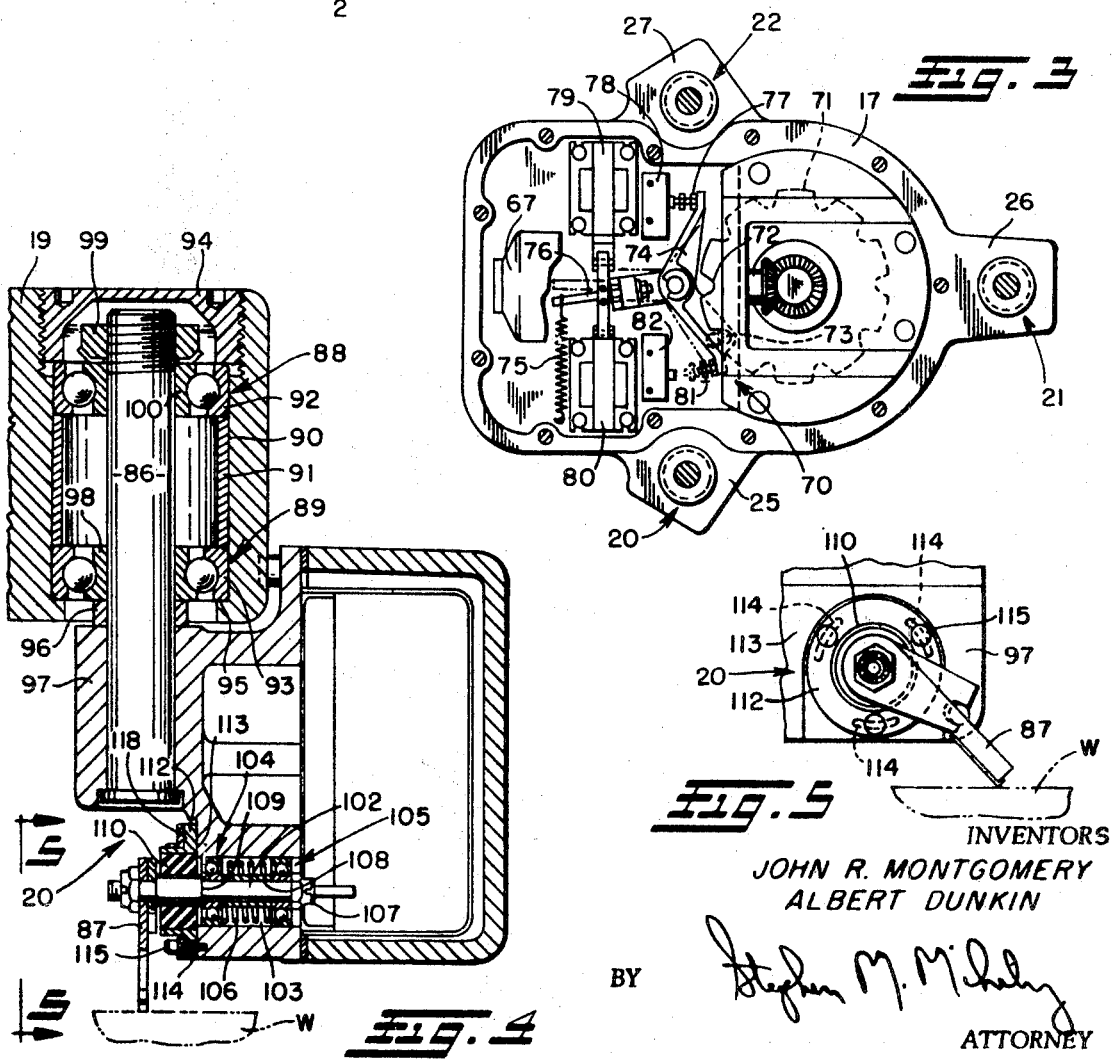

In FIG. 1 there is illustrated a rotary surface grinder 1 including a base 2 on which is mounted a column 3 for supporting a grinding wheel head 4. By actuation of a fed gear box 5 through rotation of a feed wheel 6, the grinding wheel head 4 may be caused to move toward or away from a rotary chuck 7. Mounted within the grinding wheel head 4 is a spindle 8 for driving a grinding wheel 9 suitably connected thereto.

The chuck 7 is for holding one or more workpieces W in place during rough and finish machining of flat surfaces thereon by the grinding wheel 9, and may be of the magnetic type for holding ferrous work securely in place or work fixtures may be used. A table 12 mounted on hardened steel ways 13 on the base of the machine supports the chuck 7 for horizontal movement between a loading position adjacent the grinding wheel 9 for loading and unloading workpieces from the chuck 7 and a grinding position beneath the grinding wheel 9. During grinding, the table 12 remains stationary while both the grinding wheel 9 and chuck 7 are continuously rotated so that all of the workpieces W are machined uniformly accurate for squareness, parallelism, surface finish, dimensions, etc.

As the grinding progresses the grinding wheel 9 is fed down continuously until the desired work thickness is obtained, which may be accurately determined with the use of a gauge mechanism 15 constructed in accordance with this invention. As can be seen in FIG. 1 and also more clearly seen in FIG. 2, the gauge mechanism 15 generally comprises a gauge column 16 having a housing 17 at its lower end suitably connected to a bracket 18 which may be bolted or otherwise secured to the end of the table 12 for movement therewith, and a gauge arm 19 projecting outwardly from the gauge column 16 and having a gauge head assembly 20 carried by the outward end of the gauge arm 19. Accurate vertical orientation of the gauge column 16 may be achieved by providing three spaced apart connections 20, 21, and 22 between the housing 17 and bracket 18 as shown in FIGS. 2 and 3, each consisting of a bushing 23 having threaded engagement with one of three spaced apart bores 24 in the projections 25, 26 and 27 from the housing 17. The upper end of each bushing 23 is slotted at 28 for keying of a washer 29 to the bushing 23. The washer 29 has a lip portion 30 which overlies the projection 25, 26 or 27 of the housing 17. Turning of the washers 29 will cause rotation of the bushings 23 to vary the extent of projection of the bushings 23 beyond the bottom of the projections for varying the vertical height of the housing 17 at each projection. Upward movement of the bushings 23 through turning of the washers 29 in the appropriate direction is accommodated by the clearance 31 between the washers 29 and bottom of the slots 28 without lifting the lip portions 30 out of engagement with the upper surface of the projections 25, 26 and 27, whereby tightening of the screws 32 which extend through the washers 29 and bushings 23 into tapped openings 33 in the bracket 18, will cause the lip portions 30 to tightly clamp the projections 25, 26 and 27 against the bracket. The washers 29 may be graduated if desired to make it easy to duplicate settings.

So that the gauge mechanism 15 may be used for measuring the thickness of a variety of different sized workpieces which may be located at different radial positions on the work holding chuck 7, the gauge arm 19 and gauge head assembly 20 are supported on the gauge column 16 for both vertical and rotational adjustments. The construction of the gauge column 16 which permits such adjustments is best shown in FIG. 2, and includes a stationary sleeve 35 having its lower end engaging the bottom of a recess 36 in the upper face 37 of the housing 17, such sleeve 35 being retained against movement by a plate 38 welded thereto and securely fastened to the housing 17 by screws 39. Contained within the stationary sleeve 35 is an inner movable sleeve 40 which is closely slidably received over a vertically oriented precision lead screw 41 having its lower end 42 journaled in a pair of axially adjacent bearings 43, 44 within the gauge column housing 17. An end plate 45 bolted to the housing 17 in underlying relation to the outer race 46 of the lower bearing 44 retains the outer races 46, 47 of both bearings against movement, and the weight of the lead screw 41 and structure supported thereby pressing on the inner races 48, 49 of the bearings through contact of the shoulder 50 on the lead screw with the uppermost inner race 49 eliminates any axial play that might otherwise be present in the bearings.

Concentrically disposed about the stationary sleeve 35 is an outer sleeve 51 which carries the gauge arm 19. Both the upper end of the inner sleeve 40 and outer sleeve 51 are provided with end caps 52 and 53, respectively, having opposed conical seats 54 and 55 containing a ball 56 which permits limited rotation of the outer sleeve 51 and gauge arm 19 supported thereby relative to the inner sleeve 40 and axial movement of the outer sleeve with the inner sleeve in a manner to be subsequently explained. Axially spaced apart bushings 57, 57' interposed between the lower end of the outer sleeve 51 and stationary sleeve 35 provide adequate support for the outer sleeve during such movements to maintain the desired concentric relation between such stationary and outer sleeves for all positions of the outer sleeve.

The inner sleeve 40 is supported by a split or double nut assembly 58 consisting of upper and lower nuts 59 and 60 each having threaded engagement with the lead screw 41, and a compression spring 61 interposed between the upper and lower nuts for urging the nuts axially apart against opposite surfaces of the threads 62 of the lead screw. The force exerted by the spring 61 is greater than the effective weight of the inner and outer sleeves 40 and 51 and gauge arm 19 and gauge head assembly 20 supported thereby so that the weight of these parts is carried by the upper surfaces of the lead screw threads 62 through engagement by the lower nut 60, thus concentrating the wear on the upper thread surfaces, and the upper nut 59 is urged into engagement with the lower surfaces of the lead screw thread 62 which receive very little wear. Since the axial position of the inner sleeve 40 is determined by its engagement with the upper end of the upper nut 59 and the upper nut 59 position is determined by engagement with the lower surfaces of the lead screw thread which have a preferential low wear rate, axial movements of the gauge arm 19 can be very precisely controlled, unaffected by wear of the upper surfaces of the lead screw thread. Wear of the entire lead screw may be reduced by making the upper and lower nuts of a material which is softer than that of the lead screw.

Rotation of the lead screw 41 is achieved by a drive motor 67 in the housing 17 coupled to the lower end of the lead screw 41 by a bevel gear coupling 68, and since the upper and lower nuts 59 and 60 are held against rotation by a key 69 extending along the substantial length of the inner surface of the stationary sleeve 35, such rotation of the lead screw will cause axial movements of the upper and lower nuts 59 and 60, thus raising or lowering the inner sleeve 40. Such movements of the inner sleeve 40 are in turn transmitted to the outer sleeve 51 through the ball 55 as aforesaid. The outer sleeve 51, in addition to supporting the gauge arm 19 for both vertical and rotational movements, also provides protection for the other elements of the gauge column 16, and a wiper seal 85 may be secured to the upper end of the stationary sleeve 35 for engagement with the outer surface of the sleeve 40 to prevent contamination of the drive mechanism for raising and lowering of the gauge column.

A solenoid operated detent mechanism 70 may be provided for effecting integral movements of the lead screw 41 which as shown in FIGS. 2 and 3, comprises an annular disc 71 securely fastened to the lower end of the lead screw 41 and provided with a plurality of equally spaced peripheral notches 72 engageable by a roller 73 carried by one end of a centrally pivoted support arm 74. The support arm 74 is normally urged into locking engagement with one of the notches 72 by a spring 75 having one end connected to an extension 76 from the support arm 74 and the other end connected to the housing 17, thus precluding rotation of the lead screw 41. When in such position, a contact 77 on the opposite end of the support arm 74 engages a microswitch 78 opening the circuit to the drive motor 67. Also connected to the support arm extension 76 are a pair of solenoids 79, 80 which when actuated overcome the bias of the spring 75 and move the support arm 74 to the phantom line position shown in FIG. 3 whereat the contact 77 is disengaged from the microswitch 78 for actuating the drive motor 67 and the roller 73, although still engageable with the notches 72, will readily ride in and out of the notches and thus permit the disc 71 and lead screw 41 to rotate. During such rotation, movement of the roller 73 along the contour of the disc 71 causes another contact 81 on the roller end of the support arm 74 to alternately engage and disengage another microswitch 82 which provides a pulse output for determining the vertical position of the gauge arm 19 and gauge head assembly. By using a disc 71 having ten notches 72 and a lead screw 41 having a pitch of ten, each division of the notched disc 71 will provide a pulse output corresponding to 1/100 of an inch of vertical movement of the gauge arm.

Referring now more particularly to FIGS. 4 and 5, the actual gauging of the thickness of a workpiece W on the chuck 7 is made by the gauge head assembly 20 which is supported by a vertical shaft 86 journal-mounted on the outboard end of the gauge arm 19 to permit approximately 45° of rotation of the gauge head assembly for proper orientation of the feeler arm 87 with respect to the workpiece to be measured. The bearings 88 and 89 which support the shaft 86 for rotation are maintained in axially spaced apart relation in a bore 90 in the outboard end of the gauge arm 19 by a spacer sleeve 91 interposed between the outer races 92, 93 of the bearings. A cap 94 having threaded engagement with the upper end of the bore 90 engages the outer race 92 of the upper bearing 88 thus clamping the outer races 92 and 93 against movement between the cap 94 and a shoulder 95 adjacent the lower end of the bore 90. Preloading of the bearings 88 and 89 is achieved by providing a spacer 96 between the housing 97 of the gauge head assembly 20 and the inner race 98 of the lower bearing 89 and also providing a nut 99 on the upper end of the shaft 86 which when tightened engages the inner race 100 of the upper bearing 88 urging the inner races 98 and 100 toward each other so that any axial play in the bearings which might disturb the accuracy of the device is eliminated.

The feeler arm 87 is mounted on a horizontal shaft 102 supported in a bore 103 in the gauge head assembly housing 97 by a pair of axially spaced bearings 104, 105 which are preloaded by a compression spring 106 interposed between the outer races of the bearings. The inner races are held fixed against axial movement by tightening of a nut 107 on the inner end of the shaft 102 which forces the inner races and spacer 108 disposed therebetween toward a shoulder 109 on the shaft 102.

The axis of the shaft 102 is parallel to the surface of the workpiece to be gauged, and there is a torsional spring 110 consisting of a ring of silicon rubber or other elastomeric material bonded at its inside diameter to the shaft 102 and at its outside diameter to an adjusting collar 112 surrounding the shaft adjacent an end face 113 of the housing 97. The collar 112 has a plurality of circumferential slots 114 through which extend bolts 115 for adjustably securing the collar 112 to the housing 97.

By rotating the adjusting collar 112 in a clockwise direction as seen in FIG. 5, sufficient spring force may be imparted to the shaft 102 through the torsional spring 110 to retain the feeler arm 87 in engagement with the upper face of a workpiece W and also provide sufficient damping action through the torsional spring 110 such that when the feeler arm 87 initially engages the edge of a workpiece and rides up onto the top surface thereof, it will not over-shoot the upper surface and give a false reading. When the collar 112 has been rotated to the desired extent, the bolts 115 are tightened to lock the collar in position.

Variations in the spring and damping effect of the torsional spring 110 may be obtained by varying the configuration thereof, as by providing a concave configuration on its inner surface as shown at 116 in FIG. 7. Moreover, in addition to the spring and damping effect obtained by the torsional spring, the bond of the elastomeric material with the shaft 102 and collar 112 also provides an effective seal for the shaft, which may be further enhanced by providing an integral flange 117 on the sealing ring, with or without the concave configuration, as shown in FIGS. 7 and 6, respectively. The flange 117 extends behind the flange 118 on the collar 112 between the collar and housing and is similarly slotted to permit rotational adjustment of the collar for varying the torsion load applied to the shaft 102.

In operation, the gauge column 16 is adjusted to bring the feeler arm 87 of the gauge head assembly 20 into close association with the upper surface of the workpiece to be measured, and the vertical position of the gauge column is determined by the pulses from the gauge column microswitch 82 which are fed to a bi-directional counter of suitable type which records the instantaneous position of the gauge column. Next, the collar 112 of the gauge head assembly 20 is rotated to engage the feeler arm 87 with the top surface of the workpiece W with sufficient force to provide adequate damping such that the feeler arm will not over-shoot the top surface as it rides up over the edge of each successive workpiece. Now the chuck 7 which holds the workpieces is moved to the grinding position and both the grinding wheel 9 and chuck 7 are rotated to machine the workpieces. During the machining cycle, the grinding wheel is fed toward the chuck at the desired rates until the final dimension of the workpieces is reached, which is determined by intermittent engagement of the work surfaces with the feeler arm 87 which rides along the work surfaces as they pass therebeneath to gauge the surfaces in reference to the chuck base by measuring the amount of rotation of the feeler arm 87 and thus the shaft 102 which is connected to a transducer of suitable type (not shown) for converting the rotational movement of the feeler arm to an electrical signal.

From the foregoing, it can now be seen that the gauge mechanism of the present invention is capable of making very accurate measurements of a workpiece, substantially unaffected by wear of the supporting surfaces of the gauge column lead screw, and over-shooting of the feeler arm above the work surface as it rides up onto such surfaces has been eliminated.

We, therefore, particularly point out and distinctly claim as our invention:

1. A gauge mechanism for use in gauging a workpiece comprising a gauge head assembly and a gauge column for supporting said gauge head assembly for lowering and raising said gauge head assembly toward and away from a workpiece, said gauge column comprising an axially movable vertically oriented sleeve, means mounting said sleeve for axial movement, and means connecting said gauge head assembly to said axially movable sleeve for movement therewith, said means mounting said sleeve for axial movement comprising a lead screw having one end supported against axial movement and the other end received in said movable sleeve, means for rotating said lead screw, nut means having threaded engagement with said lead screw and keyed against rotation, whereby rotation of said lead screw will cause axial movement of said nut means, said movable sleeve being supported by said nut means for axial movement therewith, said means mounting said sleeve for axial movement further comprising a stationary sleeve surrounding said movable sleeve to which said nut means is keyed against rotation, and said means connecting said gauge head assembly to said first-mentioned axially movable sleeve comprises a second axially movable sleeve having an arm projecting therefrom which supports said gauge head assembly, and a rotatable connection between said first and second mentioned axially movable sleeves permitting axial movement of the second sleeve with the first-mentioned sleeve and limited rotation of said second sleeve with respect to said first sleeve.

2. The gauge mechanism of claim 1 wherein said first and second sleeves have end caps on their upper ends and said rotatable connection therebetween comprises a ball contained in opposed conical seats in said end caps.

3. The gauge mechanism of claim 2 further comprising a wiper seal on the upper end of said stationary sleeve engaging the outer surface of said first-mentioned sleeve.

4. A gauge head assembly comprising a housing containing a bore, a shaft rotatably journaled in said bore, a feeler arm mounted on the outer end of said shaft, a collar surrounding said shaft adjacent an end face of said housing, a torsional spring interconnecting said collar with said shaft, means permitting limited rotational adjustment of said collar for varying the amount of spring force imparted to said shaft through said torsional spring to provide sufficient damping action when said feeler arm initially engages a workpiece and rides up onto the top surface thereof that said feeler arm remains in constant engagement with said workpiece, and means for releasably securing said collar to said housing in such rotational adjusted position.

5. The gauge head assembly of claim 4 wherein said last-mentioned means comprises a plurality of circumferential slots in said collar, and bolts extending through said slots for securing said collar to said housing.

6. The gauge head assembly of claim 4 wherein said torsional spring is in the form of an elastomeric ring bonded at its inside diameter to said shaft and at its outside diameter to said collar to provide a seal for said shaft.

7. The gauge head assembly of claim 6 wherein said elastomeric ring has an integral flange extending between said collar and housing for enhancing the seal for said shaft.

8. The gauge head assembly of claim 6 wherein said elastomeric ring has a concave inner surface for varying the spring and damping effect of said torsional spring.

9. A gauge mechanism for use in gauging a workpiece comprising a gauge head assembly and a gauge column for supporting said gauge head assembly for lowering and raising said gauge head assembly toward and away from a workpiece, said gauge column comprising an axially movable vertically oriented sleeve, means mounting said sleeve for axial movement, and means connecting said gauge head assembly to said axially movable sleeve for movement therewith, said gauge head assembly comprising a housing containing a bore, a shaft rotatably journaled in said bore, a feeler arm mounted on the outer end of said shaft, a collar surrounding said shaft adjacent an end face of said housing, a torsional spring interconnecting said collar with said shaft, means permitting limited rotational adjustment of said collar for varying the amount of spring force imparted to said shaft through said torsional spring to provide sufficient damping action when said feeler arm initially engages a workpiece and rides up on to the top surfaces thereof such that said feeler arm remains in constant engagement with said workpiece, and means for releasably securing said collar to said housing in such rotational adjusted position.

10. The gauge mechanism of claim 9 wherein said last-mentioned means comprises a plurality of circumferential slots in said collar, and bolts extending through said slots for securing said collar to said housing.

11. The gauge mechanism of claim 9 wherein said torsional spring is in the form of an elastomeric ring bonded at its inside diameter to said shaft and at its outside diameter to said collar to provide a seal for said shaft.

12. The gauge mechanism of claim 11 wherein said elastomeric ring has an integral flange extending between said collar and housing for enhancing the seal for said shaft.

13. The gauge mechanism of claim 11 wherein said elastomeric ring has a concave inner surface for varying the spring and damping effect of said torsional spring.

14. The gauge mechanism of claim 9 wherein said means connecting said gauge head assembly to said axially movable sleeve comprises a gauge arm projecting outwardly from said gauge column, said gauge head assembly being rotatably connected to the outboard end of said gauge arm to permit limited rotation of said gauge head assembly with respect to said gauge arm.

15. A gauge mechanism for use in gauging a workpiece comprising a gauge head assembly and a gauge column for supporting said gauge head assembly for lowering and raising said gauge head assembly toward and away from a workpiece, said gauge column comprising an axially movable vertically oriented sleeve, means mounting said sleeve for axial movement, and means connecting said gauge head assembly to said axially movable sleeve for movement therewith, said means mounting said sleeve for axial movement comprising a lead screw having one end supported against axial movement and the other end received in said movable sleeve, means for rotating said lead screw, nut means having threaded engagement with said lead screw, means for keying said nut means against rotation with said lead screw, whereby rotation of said lead screw will cause axial movement of said nut means, said movable sleeve being supported by said nut means for axial movement therewith, and means for supporting the weight carried by said nut means and urging said nut means into light engagement with the lower surfaces of the lead screw threads which provide a relatively wear-free reference surface for gauging the vertical position of said axially movable sleeve.

16. A gauge column comprising an axially movable vertically oriented sleeve, means mounting said sleeve for axial movement, and means providing a relatively wear-free reference surface on said gauge column for gauging the vertical position of said axially movable sleeve, said means mounting said sleeve for axial movement comprising a lead screw having one end supported against axial movement and the other end received in said movable sleeve, means for rotating said lead screw, nut means having threaded engagement with said lead screw and keyed against rotation, whereby rotation of said lead screw will cause axial movement of said nut means, said nut means being disposed adjacent the lower end of said movable sleeve and engaged thereby for transmitting movements of said nut means to said movable sleeve, said nut means comprising upper and lower nuts threadedly engaging said lead screw, said upper nut being engaged by the lower end of said movable sleeve and said lower nut being below said movable sleeve, said upper and lower nuts having a spring interposed therebetween for urging said nuts axially apart against opposite surfaces of the lead screw threads, the force of said spring being greater than the weight supported by said nut means so that all of such weight is carried by the upper surfaces of said lead screw threads through engagement by said lower nut to concentrate the wear on said upper surfaces, and said upper nut is urged into engagement with the lower surfaces of said lead screw threads thus to provide such relatively wear-free reference surface for gauging the vertical position of said axially movable sleeve.

17. The gauge column of claim 16 wherein said means mounting said sleeve for axial movement further comprises a stationary sleeve surrounding said movable sleeve to which said nut means is keyed against rotation, and there is a second axially movable sleeve surrounding said stationary sleeve, and a rotatable connection between said first and second-mentioned axially movable sleeves permitting axial movement of the second sleeve with the first-mentioned sleeve and limited rotation of said second sleeve with respect to said first sleeve, said first and second sleeves having end caps on their upper ends, and said rotational connection therebetween comprising a ball contained in opposed conical seats in said end caps.

18. A gauge mechanism for use in gauging a workpiece comprising a gauge head assembly and a gauge column for supporting said gauge head assembly for lowering and raising said gauge head assembly toward and away from a workpiece, said gauge column comprising an axially movable vertically oriented sleeve, means mounting said sleeve for axial movement, means providing a relatively wear-free reference surface on said gauge column for gauging the vertical position of said axially movable sleeve, and means connecting said gauge head assembly to said axially movable sleeve for movement therewith, said means mounting said sleeve for axial movement comprising a lead screw having one end supported against axial movement and the other end received in said movable sleeve, means for rotating said lead screw, nut means having threaded engagement with said lead screw and keyed against rotation, whereby rotation of said lead screw will cause axial movement of said nut means, said nut means being disposed adjacent the lower end of said movable sleeve and engageable thereby for transmitting movements of said nut means to said movable sleeve, said nut means comprising upper and lower nuts having threaded engagement with said lead screw, said upper nut being engaged by the lower end of said movable sleeve and said lower nut being disposed below said movable sleeve, said upper and lower nuts having a spring interposed therebetween for urging said nuts axially apart against opposite surfaces of the lead screw threads, the force of said spring being greater than the weight supported by said nut means so that all of such weight is carried by the upper surfaces of said lead screw threads to concentrate the wear on said upper surfaces, and said upper nut is urged into engagement with the lower surfaces of said lead screw threads thus to provide such relatively wear-free reference surface for gauging the vertical position of said axially movable sleeve.

19. A gauge mechanism for use in gauging a workpiece comprising a gauge head ashsembly and a gauge column for supporting said gauge head assembly for lowering and raising said gauge head assembly toward and away from a workpiece, said gauge column comprising an axially movable vertically oriented sleeve, means mounting said sleeve for axial movement, and means connecting said gauge head assembly to said axially movable sleeve for movement therewith, said means mounting said sleeve for axial movement comprising a lead screw having one end supported against axial movement and the other end received in said movable sleeve, means for rotating said lead screw, nut means having threaded engagement with said lead screw and keyed against rotation, whereby rotation of said lead screw will cause axial movement of said nut means, said movable sleeve being supported by said nut means for axial movement therewith, and a detent mechanism for effecting integral movements of said lead screw, said detent mechanism comprising a disc secured to the lower end of said lead screw, a plurality of spaced peripheral notches in said disc, a pivotally mounted support arm having a roller at one end engageable in said notches, means for providing a pulse output as said roller moves in and out of said notches during rotation of said disc for determining the vertical position of said gauge head assembly, a spring means for urging said roller into locking engagement with said notches, and solenoid actuated means for overcoming the bias of said spring means to move said roller to a position whereat said roller will ride in and out of said notches during rotation of said disc by said lead screw.

20. A gauge column comprising an axially movable vertically oriented sleeve, and means mounting said sleeve for axial movement, said means mounting said sleeve for axial movement comprising a lead screw having one end supported against axial movement and the other end received in said movable sleeve, means for rotating said lead screw, nut means having threaded engagement with said lead screw, means for urging said nut means against rotation with said lead screw, whereby rotation of said lead screw will cause axial movement of said nut means, said movable sleeve being supported by said nut means for axial movement therewith, and means for supporting the weight carried by said nut means and urging said nut means into light engagement with the lower surfaces of the lead screw threads which provide a relatively wear-free reference surface for gauging the vertical position of said axially movable sleeve.

References Cited
UNITED STATES PATENTS

| | | | |
|---|---|---|---|
| 2,371,742 | 3/1945 | Dickerman | 33—170 |
| 2,952,077 | 9/1960 | Burgess et al. | 33—170 |
| 3,289,310 | 12/1966 | Stone | 33—170 |

LEONARD FORMAN, Primary Examiner

D. A. DEARING, Assistant Examiner